(12) United States Patent
Choi et al.

(10) Patent No.: US 12,218,387 B2
(45) Date of Patent: Feb. 4, 2025

(54) SECONDARY BATTERY AND METHOD FOR MANUFACTURING SAME

(71) Applicant: LG Energy Solution, Ltd., Seoul (KR)

(72) Inventors: Soon Hyung Choi, Daejeon (KR); Dong In Choi, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 17/770,862

(22) PCT Filed: Nov. 23, 2020

(86) PCT No.: PCT/KR2020/016614
§ 371 (c)(1),
(2) Date: Apr. 21, 2022

(87) PCT Pub. No.: WO2021/125591
PCT Pub. Date: Jun. 24, 2021

(65) Prior Publication Data
US 2022/0384924 A1  Dec. 1, 2022

(30) Foreign Application Priority Data
Dec. 19, 2019 (KR) ........................ 10-2019-0171204

(51) Int. Cl.
*H01M 50/636* (2021.01)
*H01M 10/04* (2006.01)
(Continued)

(52) U.S. Cl.
CPC ....... *H01M 50/636* (2021.01); *H01M 10/049* (2013.01); *H01M 10/44* (2013.01); *H01M 50/105* (2021.01); *H01M 50/178* (2021.01)

(58) Field of Classification Search
CPC ............ H01M 50/636; H01M 50/178; H01M 50/105; H01M 10/049; H01M 10/44
See application file for complete search history.

(56) References Cited

U.S. PATENT DOCUMENTS

2005/0238949 A1  10/2005  Morris et al.
2011/0200855 A1   8/2011  Watanabe et al.
(Continued)

FOREIGN PATENT DOCUMENTS

CN  102282699 A  12/2011
CN  102637895 A   8/2012
(Continued)

OTHER PUBLICATIONS

JP-2011165614-A—machine translation (Year: 2011).*
(Continued)

*Primary Examiner* — Brian R Ohara
*Assistant Examiner* — Patrick Marshall Greene
(74) *Attorney, Agent, or Firm* — Lerner David LLP

(57) ABSTRACT

Provided is a secondary battery comprising: an electrode assembly; a battery case which accommodates the electrode assembly; a first electrolyte which is accommodated in the battery case and primarily impregnates the electrode assembly; and a reinforcement electrolyte member which comprises a packaging material and a second electrolyte, wherein the packaging material is accommodated in the battery case and provided with an oxidation part which is oxidized and decomposed at a set voltage, and the second electrolyte is stored in the packaging material, released to the outside of the packaging material due to the decomposition of the oxidation part, and secondarily impregnates the electrode assembly.

9 Claims, 14 Drawing Sheets

(51) Int. Cl.
  *H01M 10/44* (2006.01)
  *H01M 50/105* (2021.01)
  *H01M 50/178* (2021.01)

(56) References Cited

U.S. PATENT DOCUMENTS

| | | |
|---|---|---|
| 2011/0256429 A1 | 10/2011 | Schumann et al. |
| 2013/0288090 A1 | 10/2013 | Lee et al. |
| 2015/0037663 A1 | 2/2015 | Uhm et al. |
| 2015/0303538 A1 | 10/2015 | Chen et al. |
| 2016/0141565 A1 | 5/2016 | Uhm et al. |
| 2016/0254572 A1 | 9/2016 | Yu et al. |
| 2017/0040589 A1 | 2/2017 | Abe et al. |
| 2017/0244135 A1* | 8/2017 | Momo ............... H01M 10/0525 |
| 2018/0159112 A1 | 6/2018 | Chung et al. |
| 2020/0127248 A1 | 4/2020 | Kim et al. |
| 2020/0235427 A1 | 7/2020 | Kim et al. |

FOREIGN PATENT DOCUMENTS

| | | |
|---|---|---|
| CN | 105229823 A | 1/2016 |
| EP | 2359424 B1 | 1/2014 |
| JP | 2011165614 A | 8/2011 |
| JP | 2015041530 A | 3/2015 |
| JP | 5990619 B2 | 9/2016 |
| JP | 2016539487 A | 12/2016 |
| JP | 2017139107 A | 8/2017 |
| JP | 2017152377 A | 8/2017 |
| KR | 20040071298 A | 8/2004 |
| KR | 100958649 B1 | 5/2010 |
| KR | 20100051403 A | 5/2010 |
| KR | 20130038655 A | 4/2013 |
| KR | 101338833 B1 | 12/2013 |
| KR | 101596489 B1 | 2/2016 |
| KR | 20160060800 A | 5/2016 |
| KR | 101651515 B1 | 8/2016 |
| KR | 20170025080 A | 3/2017 |
| KR | 101793435 B1 | 11/2017 |
| KR | 20180023706 A | 3/2018 |
| KR | 2018-0062850 A | 6/2018 |
| KR | 20180062826 A | 6/2018 |
| KR | 20180075874 A | 7/2018 |
| KR | 20180082752 A | 7/2018 |
| KR | 2018-0138134 A | 12/2018 |
| KR | 101934215 B1 | 12/2018 |
| KR | 20180137345 A | 12/2018 |
| KR | 101936074 B1 | 1/2019 |
| WO | 2015163279 A1 | 10/2015 |
| WO | 2018124616 A1 | 7/2018 |

OTHER PUBLICATIONS

International Search Report for Application No. PCT/KR2020/016614 mailed Feb. 25, 2021, 2 pages.

Extended European Search Report including Written Opinion for Application No. 20902282.1 dated May 24, 2023, pp. 1-7.

Saruwatari, H. et al., "Overview and Application of Lithium Ion Battery," AEM, vol. 24, No. 4, Sep. 1, 2016, pp. 287-292. [English Translation of Abstract only].

\* cited by examiner

| Polymer host | Repeat unit | Melting point $T_m$ (°C) |
|---|---|---|
| Poly(ethylene oxide) | $-(CH_2CH_2O)_n-$ | 65 |
| Poly(propylene oxide) | $-(CH(-CH_3)CH_2O.)_n$ | 60 |
| Poly(dimethylsiloxane) | $-[SiO(-CH_3)_2]_n$ | 40 |
| Poly(acrylonitrile) | $-(CH_2CH(-CN))_n-$ | 317 |
| Poly(methyl methacrylate) | $-(CH_2C(-CH_3)(-COOCH_3))_n-$ | 105 |
| Poly(vinyl chloride) | $-(CH_2CHCl)_n-$ | 82 |
| Poly(vinylidene fluoride) | $-(CH_2CF_2)_n-$ | 171 |
| Poly(vinylidene fluoride-hexafluoropropylene) | $-(CH_2CF_2)_n-[CH_2CH(CF_3)]_m-$ | 135 |

FIG.13

| metal | Voltage | Electrolyte |
|---|---|---|
| Aluminum | 3.5V vs Li/Li+ | LiN(CF3SO2)2/ EC/PC/DMC |
| | 4.2V vs Li/Li+ | NiPF6EC/PC |
| Nickel | 4.7V vs Li/Li+ | NiClO4/EC/DG |
| | 4.9V vs Li/Li+ | LiPF6/EC/DG |
| | 4.65V vs Li/Li+ | NiBF4 EC/PC/PAN PMMA gel electrolyte |
| Silver | 3.7V vs Li/Li+ | LiBF4 or LiClO4/PC |
| Gold | 4.4V vs Li/Li+ | LiPF6/EC/DMC |
| | 5.0V vs Li/Li+ | LiPF6/EC/DEC |
| Palladium | 4.3V vs Li/Li+ | LiClO4/PC |
| Platinum | 4.3V vs Li/Li+ | LiClO4/PC |
| Titanium | 3.6V vs Li/Li+ | |
| | 3.7V vs Li/Li+ | LiBF4/PC |
| Copper | 3.2V vs Li/Li+ | LiClO4/PC |
| Chromium | 4.0V vs Li/Li+ | LiAlCL4/SO2 |
| Molybdenum | 4.0V vs Li/Li+ | LiAlCL4/SO2 |
| Zinc | 3.7V vs Li/Li+ | LiBF4/PC |

FIG.14

SECONDARY BATTERY AND METHOD FOR MANUFACTURING SAME

CROSS-REFERENCE TO RELATED APPLICATION

The present application is a national phase entry under 35 U.S.C. § 371 of International Application No. PCT/KR2020/016614, filed on Nov. 23, 2020, published in Korean, which claims priority to Korean Patent Application No. 10-2019-0171204, filed on Dec. 19, 2019, the entire contents of which are hereby incorporated herein by reference.

TECHNICAL FIELD

The present invention relates to a secondary battery comprising two types of electrolytes and a method for manufacturing same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can-type secondary battery in which an electrode assembly is built in a metal can and a pouch-type secondary battery in which an electrode assembly is built in a pouch.

The can-type secondary battery comprises an electrode assembly, an electrolyte, a can for accommodating the electrode assembly and the electrolyte, and a cap assembly mounted to an opening portion of the can. The pouch-type secondary battery comprises an electrode assembly, an electrolyte, and a pouch for accommodating the electrode assembly and the electrolyte.

There are electrolytes for the secondary battery, having high ionic conductivity, chemical stability, temperature stability, and low costs. However, since the electrolytes are input prior to activation, there are many cases in which these electrolytes are not used due to narrow ranges of their action voltages even though the electrolytes have good physical properties.

DISCLOSURE OF THE INVENTION

Technical Problem

The present invention has been made to solve the problem described above, and an object of the present invention is to provide a secondary battery, in which a packaging material storing an electrolyte having excellent physical properties is accommodated in a battery case accommodating an electrode assembly. The packaging material is made of a material oxidized at a set voltage, and the packaging material is oxidized after an activation process, thereby making it possible to impregnate the electrode assembly with the electrolyte having the excellent physical properties and thus significantly improving the battery performance.

Technical Solution

To achieve the object described above, a secondary battery comprises: an electrode assembly; a battery case configured to accommodate the electrode assembly; a first electrolyte which is accommodated in the battery case and primarily impregnates the electrode assembly; and a reinforcement electrolyte member which comprises a packaging material and a second electrolyte, wherein the packaging material is accommodated in the battery case and provided with an oxidation part which is oxidized and decomposed at a set voltage, and the second electrolyte is stored in the packaging material, released to the outside of the packaging material due to the decomposition of the oxidation part, and secondarily impregnates the electrode assembly.

The oxidation part may be made of a polymer material or a metal material which is oxidized at the set voltage.

The entirety of the packaging material may be formed of the oxidation part, or a portion of the packaging material may be formed of the oxidation part.

The set voltage may be 3 V.

The packaging material may be attached to an inner surface of the battery case.

The electrode assembly may comprise an electrode lead which is led out from the battery case, and the oxidation part provided in the packaging material may be oxidized and decomposed by a voltage transmitted from the electrode lead positioned inside the battery case.

The oxidation part may comprise a horizontal oxidation surface which is formed in a longitudinal direction of the packaging material and a vertical oxidation surface which is formed in a width direction of the packaging material perpendicular to the horizontal oxidation surface.

The oxidation part may be made of a metal material which is oxidized at the set voltage.

Also, a method for manufacturing a secondary battery of the secondary battery comprises: a step (a) of manufacturing a packaging material which comprises an oxidation part that is oxidized at a set voltage, and injecting a second electrolyte into the packaging material, thereby manufacturing a reinforcement electrolyte member; a step (b) of manufacturing a battery case which comprises an upper case and a lower case; a step (c) of attaching the reinforcement electrolyte member to an inner surface of the upper case; a step (e) of accommodating an electrode assembly through an opening portion of the battery case, and injecting a first electrolyte through the opening portion of the battery case, thereby primarily impregnating the electrode assembly with first electrolyte; a step (f) of sealing the opening portion of the battery case, thereby manufacturing an uncharged secondary battery; a step (g) of charging and discharging the uncharged secondary battery, thereby manufacturing a charged and discharged secondary battery; and a step (h) of applying a set voltage to the charged and discharged secondary battery, oxidizing an oxidation part provided in the packaging material, and secondarily impregnating the electrode assembly with the second electrolyte released through a hole formed as the oxidation part is oxidized, thereby manufacturing a complete secondary battery.

The entirety of the packaging material may be formed of the oxidation part made of a polymer material in the step (a), and the entirety of the packaging material may be oxidized and decomposed by the set voltage in the step (h).

A portion of the packaging material may be formed of the oxidation part made of a polymer material in the step (a), and only the oxidation part, which is the portion of the packaging material, may be oxidized and decomposed by the set voltage in the step (h).

When a portion of the packaging material is formed of the oxidation part made of a polymer material in the step (a), the oxidation part may be made by forming a horizontal oxidation surface in a longitudinal direction of the packaging material and forming a vertical oxidation surface in a width direction of the packaging material perpendicular to the horizontal oxidation surface.

The entirety or a portion of the packaging material may be formed of the oxidation part made of a metal material in the step (a).

Advantageous Effects

The secondary battery of the present invention has the feature in which the reinforcement electrolyte member is built in the battery case, wherein the reinforcement electrolyte member comprises: the packaging material which is provided with the oxidation part oxidized at the set voltage; and the electrolyte which is provided in the packaging material and has the excellent physical properties. Through this feature, the oxidation part is oxidized after the activation process, and the electrolyte accommodated in the packaging material may be released into the battery case. Accordingly, the electrode assembly may be impregnated with the electrolyte having the excellent physical properties, and as a result, the performance of the secondary battery may be significantly improved.

Also, the oxidation part in the secondary battery of the present invention has the feature of being made of the polymer material. Through this feature, the oxidation part may be stably oxidized at the set voltage, and as a result, the electrolyte accommodated in the packaging material may be stably released into the battery case.

Here, the oxidation part in the secondary battery of the present invention may also be made of the metal material. Accordingly, as the metal material of the oxidation part is oxidized at the set voltage, the electrolyte accommodated in the packaging material may be stably released into the battery case.

Also, the packaging material in the secondary battery of the present invention has the feature in which the entirety of the packaging material is formed of the oxidation part. Through this feature, the packaging material may be entirely oxidized inside the battery case so that none of it remains, and as a result, it is possible to prevent the occurrence of defects in the electrode assembly due to the packaging material.

Also, the packaging material in the secondary battery of the present invention has the feature in which the portion of the packaging material is formed of the oxidation part. Through this feature, it is possible to minimize generation of by-products inside the battery case. In particular, the oxidation part has the feature in which a plurality of oxidation parts are formed in the entirety of the packaging material. Through this feature, the electrolyte accommodated in the packaging material may be uniformly released to the entirety of the battery case, and as a result, it is possible to induce the electrolyte having the excellent physical properties to impregnate the entirety of the electrode assembly.

Also, the oxidation part in the secondary battery of the present invention has the feature of being oxidized at 3 V. Through this feature, it is possible to prevent the oxidation part from being oxidized during the activation process.

Also, the packaging material in the secondary battery of the present invention has the feature of being attached to the inner surface of the battery case. Through this feature, it is possible to prevent the packaging material from moving inside the battery case, and particularly, it is possible to prevent the electrode assembly accommodated in the battery case from being damaged by the packaging material.

Also, the oxidation part in the secondary battery of the present invention has the feature of being formed having a '+' shape in the packaging material. Through this feature, the packaging material may be unfolded and opened, and as a result, the electrolyte accommodated in the packaging material may be rapidly released into the battery case.

BRIEF DESCRIPTION OF THE DRAWINGS

FIG. 13 is a table showing polymer materials of the present invention.

FIG. 14 is a table showing metal materials of the present invention.

MODE FOR CARRYING OUT THE INVENTION

Figure 1:
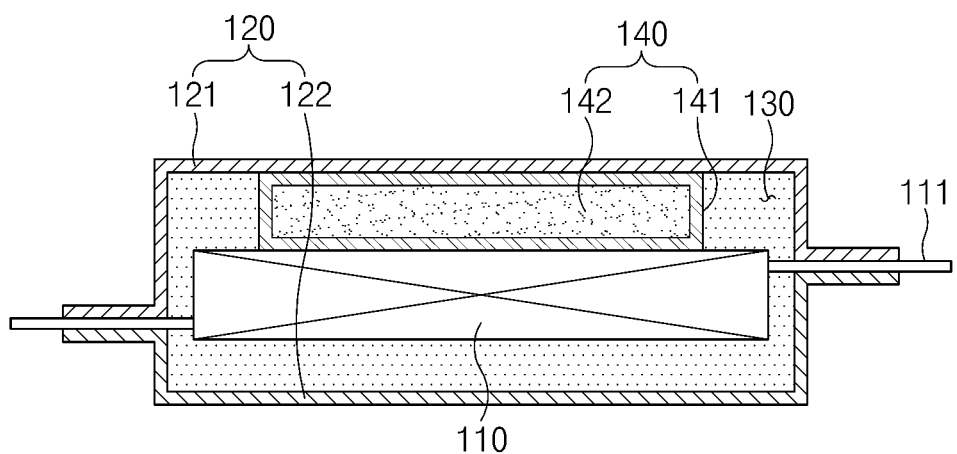
FIG. 1 is a cross-sectional view illustrating a secondary battery according to a first embodiment of the present invention.

Hereinafter, embodiments of the present invention will be described in detail with reference to the accompanying drawings so as to be easily carried out by a person skilled in the art to which the present invention pertains. However, the present invention may be implemented in various different forms, and is not limited to the embodiments described herein. Also, in the drawings, a part irrelevant to the description will be omitted to clearly describe the present invention, and similar elements will be designated by similar reference numerals throughout the specification.

[Secondary Battery According to a First Embodiment of the Present Invention]

Figure 2:
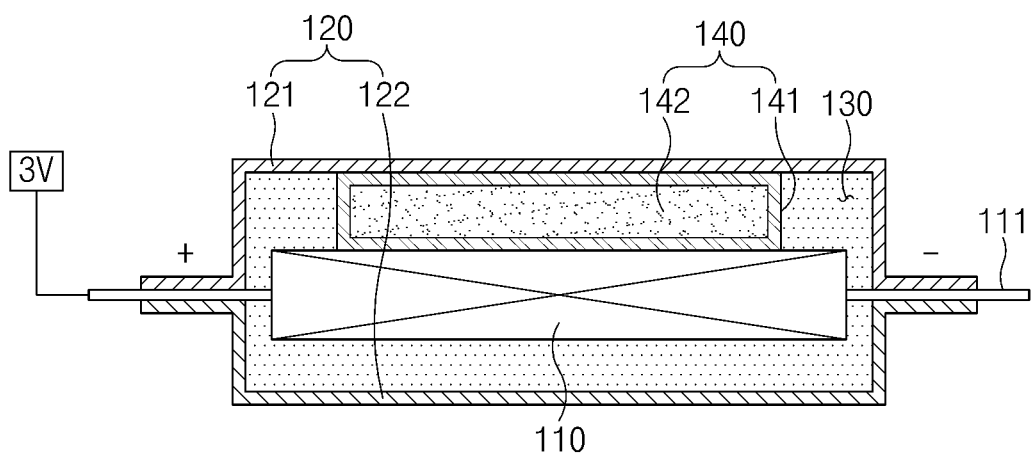
FIG. 2 is a cross-sectional view illustrating a state in which a reinforcement electrolyte member provided in the secondary battery according to the first embodiment of the present invention is oxidized.
Figure 3:
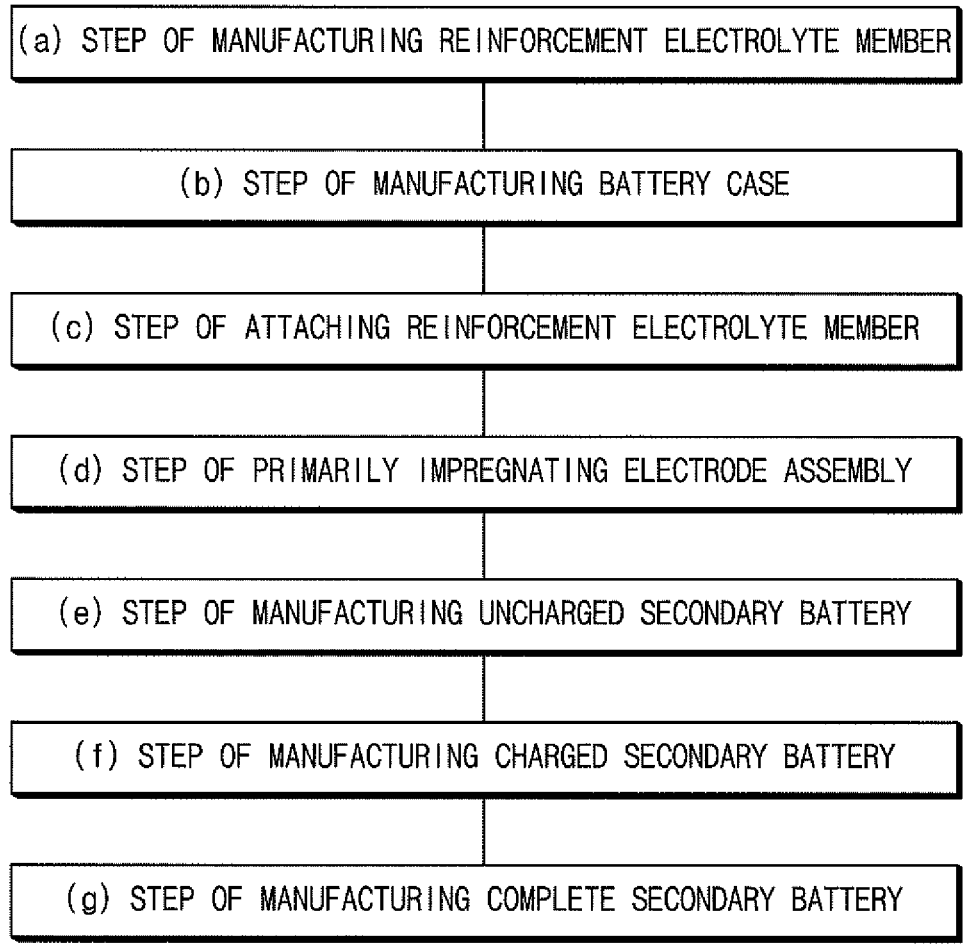
FIG. 3 is a flowchart showing a method for manufacturing the secondary battery according to the first embodiment of the present invention.
Figure 4:
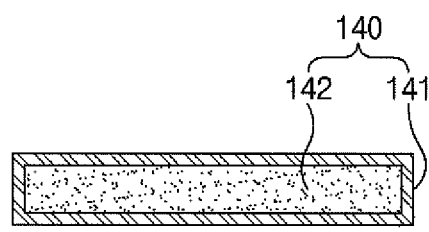
FIG. 4 is a cross-sectional view illustrating a step (a) in the method for manufacturing the secondary battery according to the first embodiment of the present invention.
Figure 5:
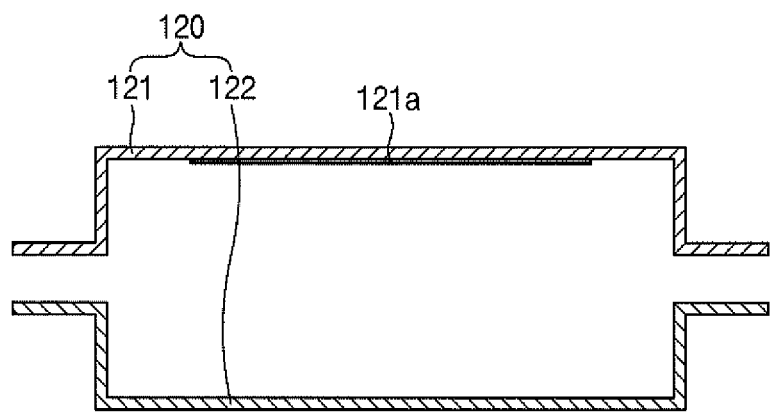
FIG. 5 is a cross-sectional view illustrating a step (b) in the method for manufacturing the secondary battery according to the first embodiment of the present invention.
Figure 6:
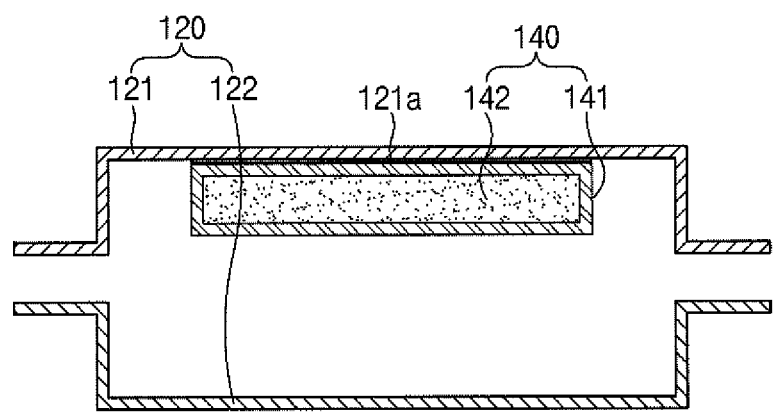
FIG. 6 is a cross-sectional view illustrating a step (c) in the method for manufacturing the secondary battery according to the first embodiment of the present invention.
Figure 7:
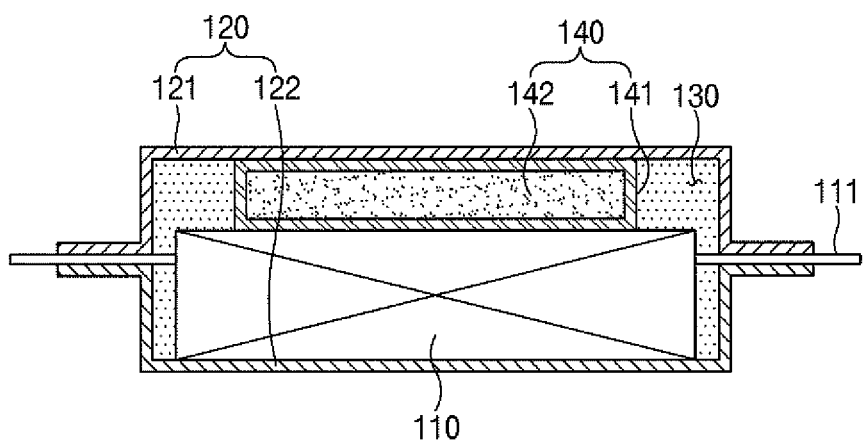
FIG. 7 is a cross-sectional view illustrating a step (d) and a step (e) in the method for manufacturing the secondary battery according to the first embodiment of the present invention.
Figure 8:
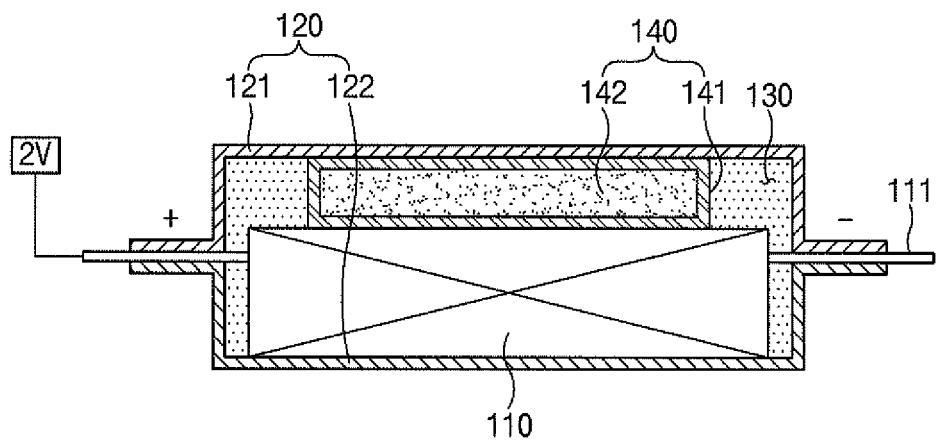
FIG. 8 is a cross-sectional view illustrating a step (f) in the method for manufacturing the secondary battery according to the first embodiment of the present invention.
Figure 9:
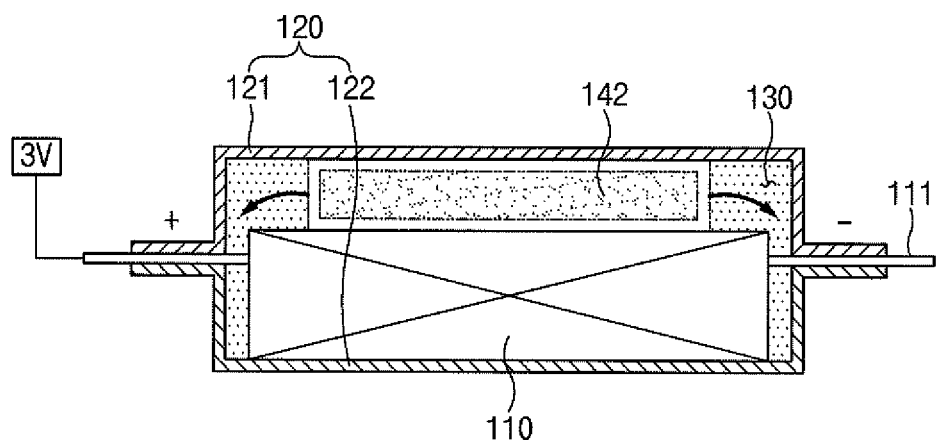
FIG. 9 is a cross-sectional view illustrating a step (g) in the method for manufacturing the secondary battery according to the first embodiment of the present invention.

As illustrated in FIGS. 1 and 2, a secondary battery 100 according to a first embodiment of the present invention has a structure for improving battery performance, and comprises an electrode assembly 110, a battery case 120 for accommodating the electrode assembly 110, a first electrolyte 130 which is accommodated in the battery case 120 and primarily impregnates the electrode assembly 110, and a reinforcement electrolyte member 140 which is built in the battery case 120 and provided with a second electrolyte for secondarily impregnating the electrode assembly 110.

Electrode Assembly

The electrode assembly 110 has a structure in which a first electrode and a second electrode are alternately stacked with a separator therebetween. Also, the first electrode comprises an electrode tab. In particular, an electrode lead 111, which is led out from the battery case 120, is coupled to the electrode tab. The first electrode may be a positive electrode, and the second electrode may be a negative electrode.

Battery Case

The battery case 120 comprises an upper case 121 and a lower case 122 which correspond to each other, and an accommodation portion for accommodating the electrode assembly 110 and a sealing portion for tightly sealing the accommodation portion are formed as the upper case 121 and the lower case 122 are coupled to each other.

First Electrolyte

The first electrolyte 130 is an electrolyte for improving charging and discharging efficiency of the electrode assembly, is provided in the accommodation portion of the battery case 120, and impregnates the electrode assembly 110.

Reinforcement Electrolyte Member

The reinforcement electrolyte member 140 comprises an electrolyte for improving battery performance after an activation process of the electrode assembly, and comprises a packaging material 141 and a second electrolyte 142 stored in the packaging material 141.

The packaging material 141 is accommodated in the battery case 120 and provided with an oxidation part that is oxidized and decomposed at a set voltage. That is, the packaging material 141 may release the second electrolyte stored inside the packaging material to the outside through a space formed as the oxidation part is oxidized.

For one example, the entirety of the packaging material 141 may be formed of the oxidation part. That is, when the entirety of the packaging material 141 is formed of the oxidation part, the packaging material 141 may be entirely oxidized and decomposed by the set voltage.

In the packaging material 141 having the configuration described above, a hole or space is formed as the packaging material 141 formed of the oxidation part is oxidized when the set voltage is applied. Accordingly, the second electrolyte stored inside the packaging material may be released into the battery case.

Here, the set voltage may be 3 V. That is, since the charging and discharging are performed at 3 V or less upon charging and discharging of the electrode assembly, it is possible to prevent the packaging material 141 from being oxidized upon charging and discharging. Also, when the voltage of 3 V or more is applied to the packaging material 141 after the activation process, the second electrolyte may be released into the battery case as the packaging material 141 is oxidized.

Here, the packaging material 141 formed of the oxidation part is made of a polymer material oxidized at the set voltage, that is, a polymer substance.

Here, as illustrated in FIG. 13, the polymer substance may be one of polyethylene oxide, polypropylene oxide, polydimethylsiloxane, polyacrylonitrile, polymethyl methacrylate, polyvinyl chloride, polyvinylidene fluoride, or polyvinylidene fluoride hexafluoropropylene.

Here, the packaging material 141 is attached to the inner surface of the battery case 120, and thus, the packaging material 141 may be prevented from moving inside the battery case 120. Accordingly, it is possible to prevent the packaging material 141 from being wound on or brought into contact with the electrode tab positioned inside the battery case 120.

The second electrolyte 142 is an electrolyte different from the first electrolyte and, particularly, is made of substances having more excellent physical properties than the first electrolyte 130.

Here, some of the substances used as the second electrolyte react below the set voltage (3 V), and Cu is eluted, thereby exhibiting high ionic conductivity. However, since a reaction occurs at the set voltage, the substances described above may not be used. In the present invention to solve the above problem, the second electrolyte is accommodated in the battery case in a state of being stored in the packaging material formed of the oxidation part, and then, the packaging material is oxidized after the activation process. Thus, the electrode assembly may be stably impregnated with the second electrolyte, and accordingly, the high ionic conductivity may be obtained.

Here, the packaging material 141 may be connected to an electrode lead positioned inside the battery case. That is, the packaging material 141 is oxidized and decomposed by the voltage which is transmitted from the electrode lead 111 positioned inside the battery case 120, and accordingly, the packaging material 141 may be effectively oxidized. Here, the packaging material 141 may be in contact with the electrode lead 111 positioned inside the battery case 120, and accordingly, the packaging material 141 may be stably oxidized and decomposed by the voltage transmitted from the electrode lead 111.

In the reinforcement electrolyte member 140 having the above configuration, the second electrolyte 142 having the physical properties is stored in the packaging material 141 formed of the oxidation part, and thus, after the activation process, the electrode assembly may be impregnated with the second electrolyte 142. As a result, the battery performance may be significantly improved.

Thus, the secondary battery 100 according to the first embodiment of the present invention comprises the reinforcement electrolyte member 140 which is provided with the packaging material 141 having the oxidation part and the second electrolyte 142. Accordingly, after the activation process, the electrode assembly may be impregnated with the second electrolyte stored in the packaging material. As a result, the battery performance may be significantly improved.

Hereinafter, a method for manufacturing the secondary battery 100 according to the first embodiment of the present invention will be described.

[Method for Manufacturing the Secondary Battery According to the First Embodiment of the Present Invention]

As illustrated in FIGS. 3 to 9, a method for manufacturing the secondary battery according to the first embodiment of the present invention comprises a step (a) of manufacturing a reinforcement electrolyte member, a step (b) of manufacturing a battery case, a step (c) of attaching the reinforcement electrolyte member, a step (d) of primarily impregnating an electrode assembly, a step (e) of manufacturing an uncharged secondary battery, a step (f) of manufacturing a charged and discharged secondary battery, and a step (g) of manufacturing a complete secondary battery.

Step (a)

The step (a) is provided to manufacture a reinforcement electrolyte member. An oxidation part made of a polymer material, which is to be oxidized at a set voltage, is prepared, and the oxidation part is processed into a pocket shape, whereby a packaging material 141 is manufactured. That is, the entirety of the packaging material 141 is formed of the oxidation part.

Next, a second electrolyte 142 having superior physical properties is injected through an opening of the packaging material 141, and then, the opening of the packaging material 141 is sealed and closed. Consequently, a reinforcement electrolyte member 140 may be manufactured.

Here, the oxidation part made of the polymer material has a thickness of 0.5 mm to 1 mm so that the oxidation is easily performed when the set voltage is applied. That is, when having a thickness of 0.5 mm or less, the oxidation part may be easily cut due to an external impact. When the thickness is 1 mm or more, a large amount of time is required for the oxidation. Accordingly, the oxidation part made of the polymer material has the thickness of 0.5 mm to 1 mm. Thus, the oxidation part is not easily cut by the external impact and may be rapidly oxidized when the set voltage is applied.

Figure 10:
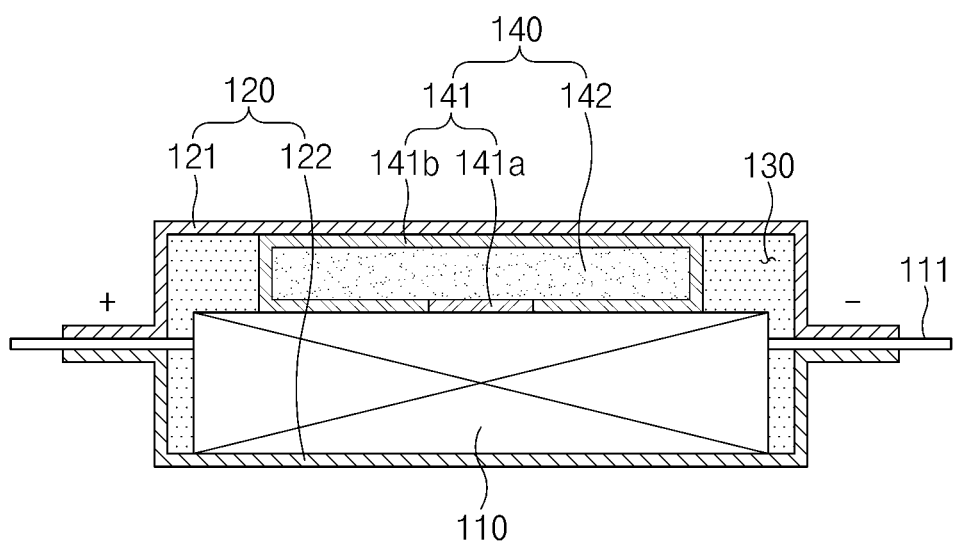
FIG. 10 is a cross-sectional view illustrating a secondary battery according to a second embodiment of the present invention.

Here, referring to FIG. 10, an upper surface of a packaging material 141 attached to a battery case 120 may be formed of a resin layer 141b, and a remaining surface may be formed of an oxidation part 141a made of a polymer material which is oxidized at a set voltage. Here, the resin layer may be thermally fused to an inner surface of the battery case 120. Accordingly, the manufacturing costs of the packaging material 141 may be reduced, and the packaging material 141 may be stably attached to the battery case 120. Also, the entire resin layer formed on the top surface of the packaging material 141 is attached to the inner surface of the battery case 120, and accordingly, it is possible to prevent by-products from being generated inside the battery case.

Step (b)

The step (b) is provided to manufacture a battery case. Two sheets of pouch films are formed to manufacture an upper case 121 and a lower case 122 corresponding to each other, and a battery case 120 may be manufactured by coupling the upper case and the lower case.

Here, an adhesive surface 121a is provided on the inner surface of the upper case to which the reinforcement electrolyte member 140 is to be attached. The adhesive surface 121a may enhance an adhesion force of the reinforcement electrolyte member 140 and prevent damage to the resin layer positioned on the inner surface of the upper case.

Step (c)

The step (c) is provided to attach the reinforcement electrolyte member. The reinforcement electrolyte member 140 is attached to the inner surface of the upper case 121 of the battery case 120. Here, the reinforcement electrolyte member 140 may be attached to the inner surface of the upper case through thermal fusion or an adhesive.

Also, the reinforcement electrolyte member 140 is attached to a center of the inner surface of the upper case. Accordingly, the second electrolyte 142 released from the reinforcement electrolyte member 140 is uniformly diffused over the entirety of an electrode assembly 110 accommodated in the battery case 120, and thus, the entirety of the electrode assembly 110 may be uniformly impregnated with the second electrolyte 142.

Also, a reinforcement electrolyte member 140 may be additionally attached to an inner surface of the lower case, and accordingly, the electrode assembly 110 may be effectively impregnated with the second electrolyte 142.

Also, the reinforcement electrolyte member 140 attached to the upper case and the reinforcement electrolyte member 140 attached to the lower case are disposed not to correspond to each other. That is, the reinforcement electrolyte member 140 is attached to one side of the inner surface of the upper case, and the reinforcement electrolyte member 140 is attached to the other side of the inner surface of the lower case. Accordingly, the second electrolyte 142 may be supplied to one side and the other side of the electrode assembly, and thus, the entirety of the electrode assembly may be effectively impregnated with the second electrolyte 142.

Step (d)

The step (d) is provided to primarily impregnate the electrode assembly. The electrode assembly 110 is accommodated through an opening portion of the battery case 120, and then, the first electrolyte 130 is injected through the opening portion of the battery case 120. Accordingly, the electrode assembly 110 is primarily impregnated with the first electrolyte 130 injected into the battery case 120.

Here, substances having excellent impregnation and charging/discharging capability are used as the first electrolyte 130, and accordingly, an impregnation time for the electrode assembly 110 may be reduced.

Step (e)

The step (e) is provided to manufacture an uncharged secondary battery. After the injection of the first electrolyte is completed, the opening portion of the battery case 120 is sealed and closed. Consequently, the uncharged secondary battery may be manufactured.

Step (f)

The step (f) is provided to manufacture a charged and discharged secondary battery. The uncharged secondary battery is activated by charging and discharging. Consequently, the charged and discharged secondary battery may be manufactured.

Here, when the uncharged and undischarged secondary battery is charged and discharged in the step (f), the charging and discharging is performed at voltage of 3 V or less, preferably, at voltage of 2 V or less.

Step (g)

The step (g) is provided to manufacture a complete secondary battery. A set voltage is applied to the charged and discharged secondary battery. Accordingly, the voltage is transmitted to the reinforcement electrolyte member 140 attached to the battery case 120, and thus, the packaging material 141 provided in the reinforcement electrolyte member 140 is oxidized and decomposed by the set voltage. Consequently, the second electrolyte 142 stored in the packaging material 141 is released into the battery case 120, and the electrode assembly 110 is secondarily impregnated therewith. When the processes described above are completed, the complete secondary battery 100 may be manufactured.

Here, the entirety of the packaging material 141 is formed of the oxidation part made of the polymer material, and accordingly, the packaging material 141 is entirely oxidized and decomposed when the set voltage is applied thereto. That is, the packaging material may be naturally removed in the battery case 120.

Hereinafter, in describing another embodiment of the present invention, components having the same functions as those in the foregoing embodiment are given the same reference numerals, and their duplicated descriptions will be omitted.

[Secondary Battery According to a Second Embodiment of the Present Invention]

Figure 11:
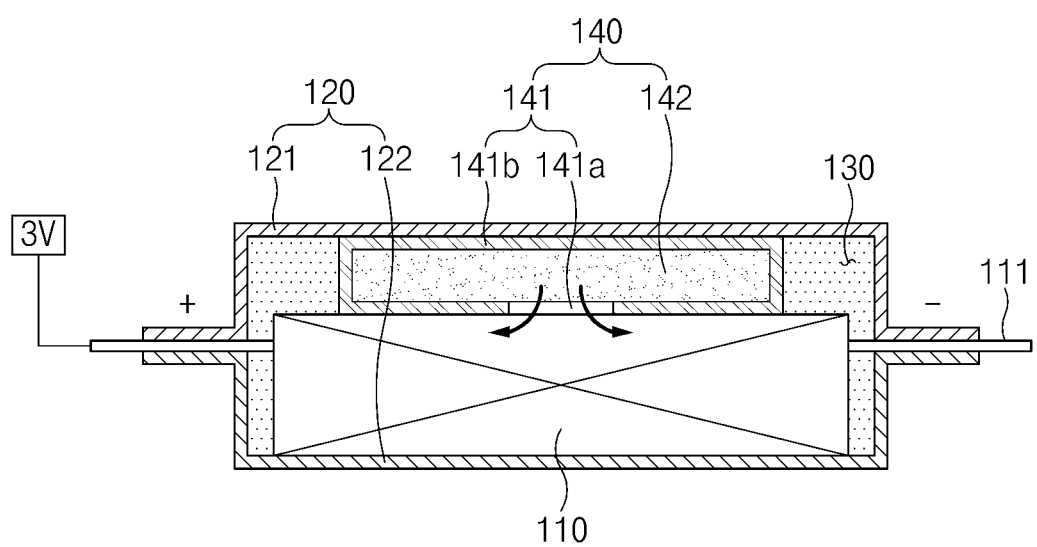
FIG. 11 is a cross-sectional view illustrating a state in which a reinforcement electrolyte member provided in the secondary battery according to the second embodiment of the present invention is oxidized.
Figure 12:
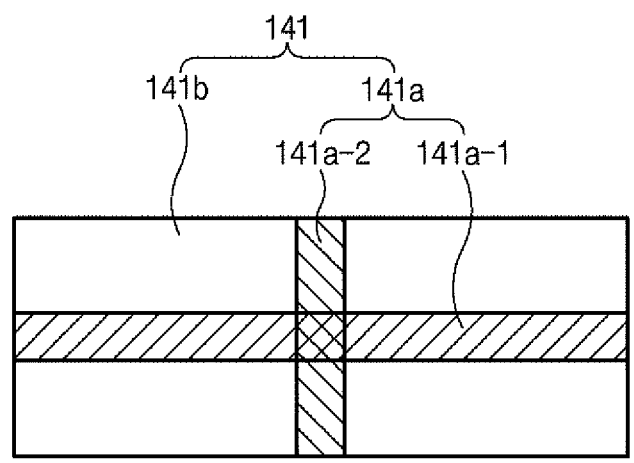
FIG. 12 is a view illustrating an oxidation part of the reinforcement electrolyte member provided in the secondary battery according to the second embodiment of the present invention.

As illustrated in FIGS. 10 to 12, a secondary battery 100 according to the second embodiment of the present invention comprises an electrode assembly 110, a battery case 120, a first electrolyte 130, and a reinforcement electrolyte member 140 which is built in the battery case 120 and provided with a second electrolyte that secondarily impregnates the electrode assembly 110. The reinforcement electrolyte member 140 comprises a packaging material 141 and a second electrolyte 142 stored in the packaging material 141.

Here, a portion of the packaging material 141 is formed of an oxidation part 141a which is oxidized and decomposed at a set voltage. That is, the portion of the packaging material 141 is formed of the oxidation part 141a which is oxidized and decomposed at the set voltage, and the reaming portions thereof are made of a resin layer 141b which is not oxidized at the set voltage.

That is, a portion of the packaging material 141, which is attached to the battery case 120, may be formed of the resin layer 141b, and a portion, which is not attached to the battery case 120, may be formed of the oxidation part 141a.

Thus, in the secondary battery 100 according to the second embodiment of the present invention, the second electrolyte 142 stored in the packaging material 141 may be released into the battery case 120 at the set voltage, and particularly, generation of by-products may be minimized by partially oxidizing the packaging material 141.

Here, the oxidation part 141a is formed in each of at least two or more places of the packaging material 141, preferably, at each of 10 or more places. Accordingly, when the oxidation parts 141a are oxidized, at least 10 or more holes may be formed in the packaging material 141. As a result, the second electrolyte 142 may be effectively released.

Here, the oxidation part 141a comprises a horizontal oxidation surface 141a-1 which is formed in a longitudinal direction of the packaging material 141 and a vertical oxidation surface 141a-2 which is formed in a width direction of the packaging material 141 perpendicular to the horizontal oxidation surface 141a-1. Accordingly, when the horizontal oxidation surface 141a-1 and the vertical oxidation surface 141a-2 are oxidized, the packaging material 141 is unfolded, and the second electrolyte 142 may be rapidly released.

[Method for Manufacturing the Secondary Battery According to the Second Embodiment of the Present Invention]

A method for manufacturing the secondary battery according to the second embodiment of the present invention comprises a step (a) of manufacturing a reinforcement electrolyte member, a step (b) of manufacturing a battery case, a step (c) of attaching the reinforcement electrolyte member, a step (d) of primarily impregnating an electrode assembly, a step (e) of manufacturing an uncharged secondary battery, a step (f) of manufacturing a charged and discharged secondary battery, and a step (g) of manufacturing a complete secondary battery.

Here, in the step (a), an oxidation part 141a, which is made of a polymer material having a predetermined size, is processed, and then, the oxidation part 141a is disposed in a die having a form of a packaging material. Next, a resin solution is injected into the die to manufacture a resin layer 141b. Consequently, a packaging material 141, in which the oxidation part 141a and the resin layer 141b are integrated, may be manufactured.

Here, the oxidation part is made by forming a horizontal oxidation surface in a longitudinal direction of the packaging material and forming a vertical oxidation surface in a width direction of the packaging material perpendicular to the horizontal oxidation surface.

Here, when a set voltage is applied to the packaging material in the step (g), the oxidation part provided in the packaging material is oxidized, and a hole is formed. The second electrolyte stored in the packaging material is released to the outside of the battery case via the hole, and the electrode assembly is impregnated therewith.

[Secondary Battery According to a Third Embodiment of the Present Invention]

An oxidation part in a secondary battery 100 according to the third embodiment of the present invention is made of a metal material which is oxidized at a set voltage as listed in FIG. 14. The metal material may be one of aluminum, nickel, silver, gold, palladium, platinum, titanium, tantalum, copper, chromium, molybdenum, or zinc.

That is, in the secondary battery 100 according to the third embodiment of the present invention, when the metals that form the oxidation parts are combined to electrolytes, it may be found that oxidation occurs at 3 V or more in all cases as listed in FIG. 14.

For one example, when 3.7 V is applied to a secondary battery which comprises an electrolyte (LIBVF4) and a reinforcement electrolyte member in which an oxidation part made of a silver material is used, it may be found that the oxidation part made of the silver material is oxidized.

Thus, in the secondary battery 100 according to the third embodiment of the present invention, the oxidation part may be stably oxidized at 3 V or more, and as a result, the second electrolyte stored in the packaging material may be stably released.

The scope of the present invention is defined by the appended claims rather than the foregoing description, and various embodiments derived from the meaning and scope of the claims and their equivalent concepts are also possible.

DESCRIPTION OF THE SYMBOLS

100: Secondary battery
110: Electrode assembly
120: Battery case
130: First electrolyte
140: Reinforcement electrolyte member
141: Packaging material
141a: Oxidation part
142: Second electrolyte

The invention claimed is:

1. A secondary battery comprising:
an electrode assembly;
a battery case accommodating the electrode assembly therein;
a first electrolyte accommodated in the battery case, the first electrolyte primarily impregnating the electrode assembly, the first electrolyte being configured to be charged and discharged at a charging voltage 3 V or less; and
a reinforcement electrolyte member which comprises a packaging material and a second electrolyte,
wherein the packaging material is accommodated inside the battery case and has an oxidation part which is configured to be oxidized and decomposed at a predetermined voltage, the predetermined voltage being at least 3 V and greater than the charging voltage, and the second electrolyte is stored within the packaging material and is configured to be released to the outside of the packaging material upon decomposition of the oxidation part, thereby secondarily impregnating the electrode assembly, and wherein the second electrolyte has a different chemical composition than the first electrolyte, the second electrolyte configured to elute copper into the electrode assembly by reacting at a voltage below the predetermined voltage, thereby increasing the ionic conductivity of the electrode assembly.

2. The secondary battery of claim 1, wherein the oxidation part is made of a polymer material which is configured to be oxidized at the predetermined voltage.

3. The secondary battery of claim 1, wherein an entirety of the packaging material is formed of the oxidation part.

4. The secondary battery of claim 1, wherein a portion of the packaging material is formed of the oxidation part.

5. The secondary battery of claim 1, wherein the packaging material is attached to an inner surface of the battery case.

6. The secondary battery of claim 1, wherein the electrode assembly comprises an electrode lead which extends out through the battery case, and the oxidation part of the packaging material is configured to be oxidized and decomposed by a voltage transmitted from the electrode lead.

7. The secondary battery of claim 4, wherein the oxidation part comprises a horizontal oxidation surface of the packaging material which extends in a longitudinal direction of the packaging material and a vertical oxidation surface of the packaging material which extends in a width direction of the packaging material perpendicular to the horizontal oxidation surface.

8. The secondary battery of claim 5, further comprising an adhesive surface provided on the inner surface of the battery case, the packaging material being attached to the adhesive surface.

9. The secondary battery of claim 1, wherein the oxidation part is made of a metal material which is configured to be oxidized at the predetermined voltage.

* * * * *